United States Patent [19]

Hanabusa

[11] Patent Number: 4,879,566

[45] Date of Patent: Nov. 7, 1989

[54] THERMAL RECORDING APPARATUS

[75] Inventor: Tadashi Hanabusa, Zushi, Japan

[73] Assignee: Canon Kabushiki Kaisha, Tokyo, Japan

[21] Appl. No.: 141,772

[22] Filed: Jan. 11, 1988

[30] Foreign Application Priority Data

Jan. 13, 1987 [JP] Japan .................................... 62-5810
Dec. 16, 1987 [JP] Japan .................................... 62-316007

[51] Int. Cl.[4] ........................ G01D 15/10; B41J 11/20; B41J 3/20

[52] U.S. Cl. ................................ 346/76 PH; 400/56; 400/120

[58] Field of Search .............. 346/76 PH; 400/56, 120

[56] References Cited

U.S. PATENT DOCUMENTS

| | | | |
|---|---|---|---|
| 4,439,777 | 3/1984 | Aprato | 400/56 X |
| 4,676,675 | 6/1987 | Suzuki et al. | 400/56 |
| 4,710,040 | 12/1987 | Grey | 400/120 X |

FOREIGN PATENT DOCUMENTS

| | | | |
|---|---|---|---|
| 148088 | 7/1986 | Japan | 400/56 |
| 61-206671 | 9/1986 | Japan . | |
| 61-219665 | 9/1986 | Japan . | |
| 270177 | 11/1986 | Japan | 400/56 |
| 62-20835 | 2/1987 | Japan . | |

*Primary Examiner*—George H. Miller, Jr.

*Attorney, Agent, or Firm*—Fitzpatrick, Cella, Harper & Scinto

[57] ABSTRACT

A thermal recording apparatus capable of regulating the pressure of thermal head and the energizing time or supply voltage of the thermal head according to the quality of recording sheet. A higher pressure and a higher energy or voltage are used for a coarse recording sheet to ensure clear image recording. Plural sets of these values can be stored in a memory and suitably selected by the operator or automatically according to the quality of sheet.

17 Claims, 14 Drawing Sheets

FIG. 11

| | ROUGH SHEET SMOOTHNESS 5~6s | SMOOTH SHEET SMOOTHNESS 50s~ |
|---|---|---|
| ENERGY TO HEAT ELEMENTS | 18.8 mJ / mm² | 13.5 mJ / mm² |
| VOLTAGE TO HEAT ELEMENTS | 13.4 V | 11.3 V |
| HEAD PRESSURE | 1000 gf | 350 gf |

THERMAL RECORDING APPARATUS

BACKGROUND OF THE INVENTION

1. Field of the Invention

The present invention relates to a thermal recording apparatus for recording on a recording medium with heat, and more particularly to such a thermal recording apparatus adapted for use in an electronic typewriter, a word processor, a facsimile machine, a copying machine, a printer or the like.

The thermal recording apparatus includes a serial type in which a recording head is moved in the transversal direction of a recording sheet, a line print type in which a line is recorded collectively, and a page print type in which a page is recorded collectively. Also the recording method includes a so-called thermal transfer method in which ink is transferred from an ink ribbon for example onto plain paper, and a so-called thermal print method in which a thermal recording sheet is directly heated with a thermal head.

2. Related Background Art

FIG. 1 is a schematic plan view showing a principal portion of a conventional thermal recording apparatus.

A thermal head 3 is fixed on a portion of a head arm 31 facing a platen 11. The head arm 31 is approximately T-shaped, and the left end portion is rotatably supported by a shaft 32 on a carriage. From the center of a horizontal portion of the head arm 31 there vertically extends an arc-shaped rack 35 which meshes with a motor pinion 36. At the right-hand end of the horizontal portion of the head arm 31 there engages an end of a torsion spring 34, of which the other end engages with a hole 33 formed in the carriage 13. The torsion spring 34 is so provided as to bias the right-hand end of the head arm 31 toward the platen 11.

When the motor pinion 36 rotates clockwise in the illustration, the heat arm 31 rotates counterclockwise about the shaft 32, thereby pressing the thermal head 3 against the platen 11 across the recording sheet 1. In this state, the torsion coil spring 34, being so provided as to bias the head arm 31 toward the platen 11, remains pressed by the motor pinion 11 and does not hinder the printing operation.

On the other hand, in the non-printing state (head-up state), the motor is reversed to rotate the motor pinion 36 anticlockwise, thereby rotating the head arm 31 clockwise. The head arm 31 is returned against the biasing force of the torsion coil spring 34, and remains in the returned position since the biasing force of the torsion spring 34 is not applied beyond a certain angle.

However, in such conventional thermal recording apparatus, since the head pressure at the printing operation is constant, the pressing force cannot be regulated according to the kind of the recording sheet (surface smoothness, rigidity, thickness, etc.) though such regulation is in fact necessary. Consequently the pressure tends to be selected unnecessarily high, thus eventually reducing the service life of the thermal head. Also for the same reason, the electric power supplied to the electrothermal converting elements of the thermal head is often more than necessary, in order to increase the amount of generated heat, thereby reducing the service life of the thermal head. Also it is often not possible to obtain a clear recorded image.

SUMMARY OF THE INVENTION

An object of the present invention is to provide a thermal recording apparatus capable of image recording with a head pressure matching the species of the recording medium.

Another object of the present invention is to provide a thermal recording apparatus capable of clear image recording.

Still another object of the present invention is to provide a thermal recording apparatus with an improved service life.

Still another object of the present invention is to provide a thermal recording apparatus capable of regulating both the electric energy supplied to the thermal head and the pressure thereof by means of single density regulating means, according for example to the species of the recording medium.

Still another object of the present invention is to provide a thermal recording apparatus capable of storing plural sets of the thermal head pressure and the value of electric energy to be supplied to the thermal head, and selecting one of said plural sets to regulate the thermal head pressure and the supplied electrical energy, thereby obtaining an optimum density for the recording medium in a simple manner.

Still another object of the present invention is to provide a thermal recording apparatus capable of renewing the data of a selected one of the plural sets thus stored, in response to the instructed values of regulating means for the thermal head pressure and of regulating means for the electrical energy.

BRIEF DESCRIPTION OF THE DRAWINGS

FIG. 11 is a chart showing the relationship between the quality of the recording sheet and the head pressure and energy supplied to heat generating resistors;

DETAILED DESCRIPTION OF THE PREFERRED EMBODIMENTS

At first there will be explained a serial thermaltransfer recording apparatus suitable for practicing the present invention.

Figure 1:
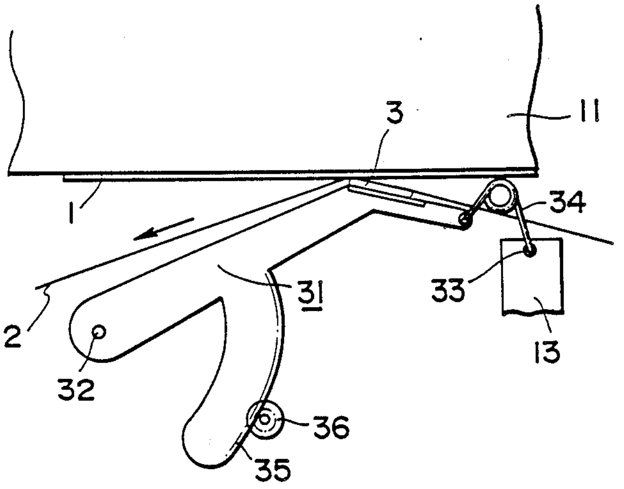
FIG. 1 PRIOR ART
FIG. 1 is a schematic plan view of a conventional thermal recording apparatus.
Figure 2:
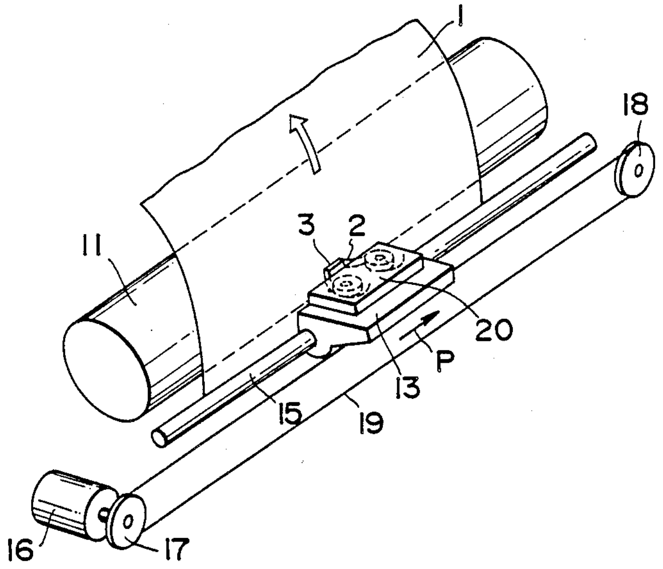
FIG. 2 is a perspective view of a serial thermaltransfer recording apparatus adaptable to the present invention.

FIG. 2 is a perspective view of such a serial thermal-transfer recording apparatus.

In FIG. 2, a thermal head 3 mounted on a carriage 13 forms recording on a recording sheet 1 supported by a platen 11. The illustrated platen 11 is formed as a roller serving as a sheet transporting roller.

The carriage 13 is rendered movable along a guide shaft 15 positioned parallel to the platen 11, and is reciprocated along the recording sheet 1 by means of a drive system composed of a stepping motor 16, a driving pulley 17, an idler pulley 18 and a belt running over the pulleys and connected to the carriage 13.

Figure 3:
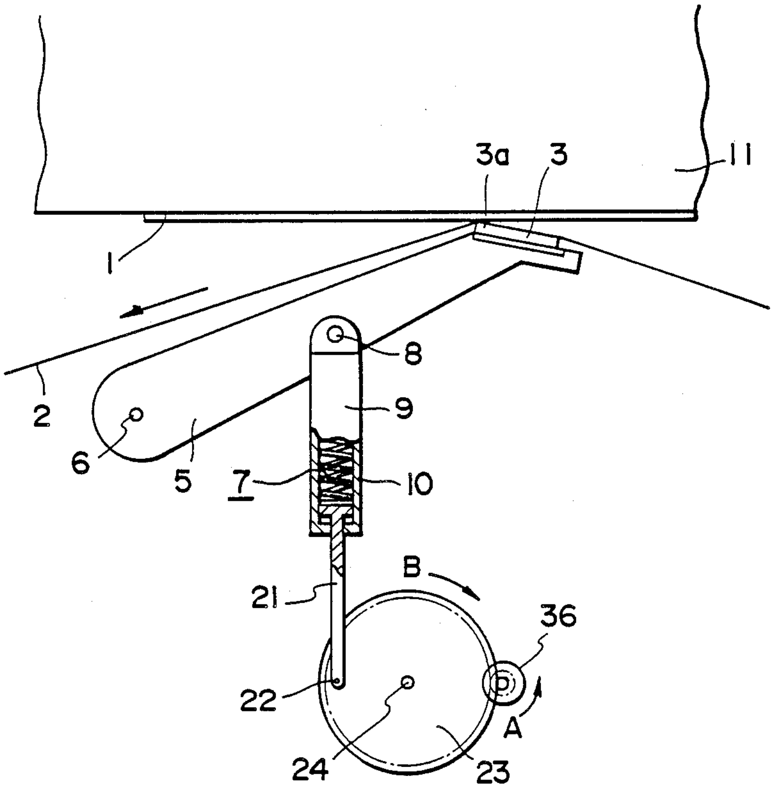
FIG. 3 is a schematic front view of an embodiment of the present invention.

The thermal head 3 is provided with plural heat generating 32 heat-generating elements 3*a*, shown in FIG. 3, for example resistors arranged in a vertical array, and is rendered movable between a down position in contact with the recording sheet 1 and an up position separate from the recording sheet.

On the carriage 13 there is interchangeably mounted a ribbon cassette 20 for feeding an ink ribbon 2 into a space in front of the thermal head 3, namely between the thermal head and the recording sheet 1.

In the recording operation, the ink ribbon 2 in the ribbon cassette 20 is taken up by a ribbon winding shaft (not shown) provided on the carriage 13 in a predetermined direction, in synchronization with the scanning movement of the thermal head 3 or the carriage 13.

In the recording operation, the thermal head 3 is pressed to the recording sheet 1 across the ink ribbon 2, and the ink ribbon 2 is wound up while the carriage 13 is moved in a direction P as the main scanning motion. Recording operation is achieved in the course of the movement, by activating dot forming means on the thermal head 3 moving integrally with the carriage 13, in response to a print data signal.

Now reference is made to FIGS. 3 to 6 for explaining the function of the above-described embodiment.

Figure 4:
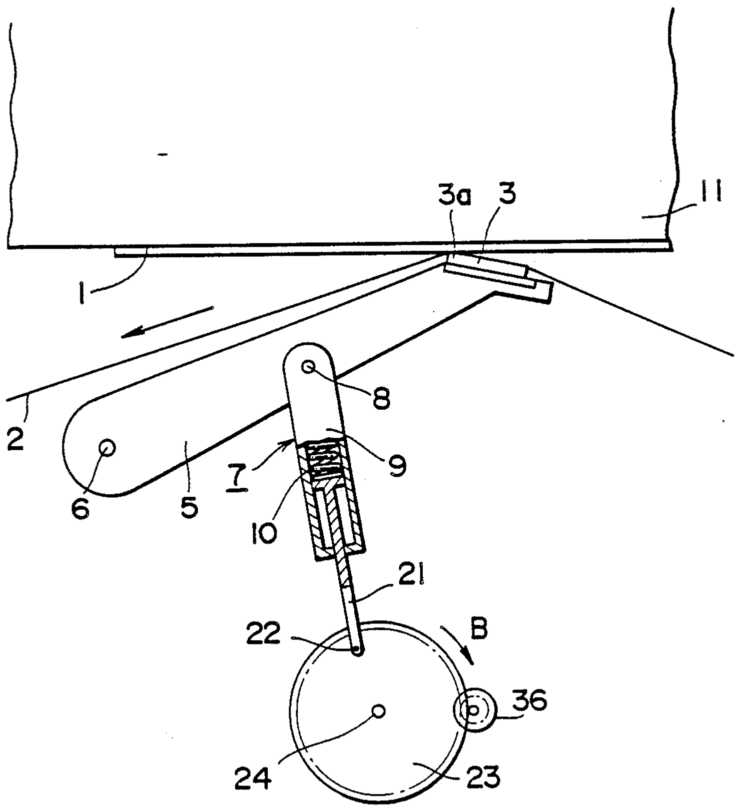
FIG. 4 is a schematic front view in which the head pressure s increased from the state shown in FIG. 3.

FIG. 3 is a schematic front view of an embodiment of the present invention, while FIG. 4 is a schematic front view in which the head pressure is increased from the state shown in FIG. 3.

In FIG. 3, a head arm 5, bearing the thermal head at an end thereof, is J-shaped and is supported, by a shaft 6, at an end opposite to the end bearing the thermal head. There are provided plural heat-generating elements 3*a*. To the center of the head arm 5 there is rotatably articulated, by means of a shaft 8, a cylinder 7 serving as a mechanism for regulating the pressure of the head 3. Cylinder 7 is composed of a cylinder block 9, a coil spring 10 inserted in cylinder block 9, and a piston 21 capable of pressing spring 10. An end of piston 21 is linked, by a shaft 22, to a peripheral portion of a gear 23.

Figure 5:
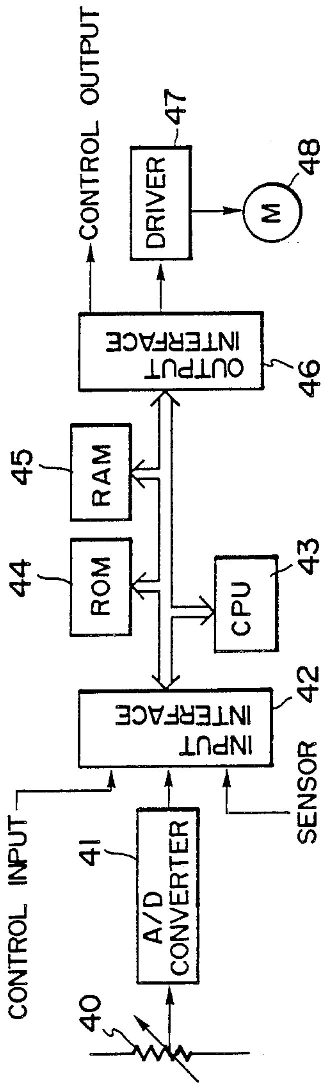
FIG. 5 is a block diagram of a motor drive control system adapted for use in an embodiment of the present invention.

The gear 23, supported by a shaft 24, meshes with a motor pinion 36 fixed on the shaft of a motor 48 shown in FIG. 5 (or motor 110 in FIG. 7), and is rendered rotatable with respect to the piston 21.

In the recording operation with the aboveexplained mechanism, the motor pinion 36 is rotated in a direction A to rotate the gear 23 in a direction B, whereby the shaft 22 moves the piston upward (toward the head arm 5) to compress the coil spring 10 in the cylinder 7. The more the gear 23 rotates, the more the coil spring 10 is compressed. Such movement of the piston 21 toward the head arm 5 causes the head arm 5 to rotate counterclockwise about the shaft 6, thus pressing head 3 to the platen 11, with a pressure proportional to the amount of compression of the coil spring 10. The rotation of the motor 48 (110) is terminated to stop the piston 21 at a desired pressure. In such stopped state, the motor 48 (110) is fixed by energization, so that the gear 23 does not rotate inversely even after the rotation of the motor is stopped (See, for example, step 104 in FIG. 6). In such pressed state a carrier motor 16 (FIGS. 2 and 9) and the heat generating resistors 3*a* of the thermal head 3 are activated to achieve image recording on the sheet 1.

FIG. 4 shows a state in which the pressure is further increased by additional rotation of the gear 23 in a direction B from the state shown in FIG. 3.

In comparison with the state shown in FIG. 3, the piston 21 enters deeper into the cylinder block 9, thus compressing the coil spring 10 more and increasing the contact pressure of the thermal head 3 onto the recording sheet 1.

In the non-printing state (head up state), the motor pinion 36 is rotated in a direction opposite to the direction of FIG. 3 to return the piston 21 downwards, thereby moving the cylinder 7 downwards. Thus the head arm 5 is rotated clockwise about the shaft 6, and the thermal head 3 is supported at a position separate from the recording sheet 1.

As explained above, the pressure of the thermal head 3 on the recording sheet 1 and the ink ribbon 2 can be arbitrarily regulated by the amount of rotation of the gear 23, or of the motor 48 (110). A pressure matching the species of the recording sheet 1 can be obtained, if the motor 48 (110) driving the motor pinion 36 is a DC motor, by regulating the energizing time of the motor 48 (110) by a switch or a variable resistor to be operated by the operator according to the species of the recording sheet 1, or, if the motor 48 (110) is a stepping motor, by regulating the number of steps of the driving motor.

FIG. 5 is a block diagram of a motor drive control system, wherein provided is a variable resistor 40 for regulating the head pressure according to the species of the sheet. The output of the resistor is converted, by an A/D converter 41 into a digital signal, which is fed to a RAM 45 through an input interface 42, under the control of a CPU 43. According to a program stored in a ROM 44, the CPU 43 temporarily stores the input information in the RAM 45, and releases, based on the information and data previously stored in the ROM 44, control information to the outside through an output interface 46. The CPU 43 also effects various control operations for realizing serial recording.

Based on the information concerning the species of the recording sheet, stored in the RAM 45, the CPU 43 determines a motor energizing time matching said species, and provides a driver 47 with a digital control signal through the output interface 46. At the start of recording operation, in response to the control information from the output interface 46, the driver 47 energizes the motor 48 for the selected period, thus rotating the motor pinion 36. Also at the end of the recording operation, the CPU 43 reverses the motor 48 for a predetermined period, thereby lifting the head 3 from the platen 11.

The variable resistor 40 selects a longer energizing time for the motor 48 for a rigid sheet 1 or a sheet with coarse surface, and a shorter energizing time for a soft sheet or a sheet with smooth surface.

Figure 6:
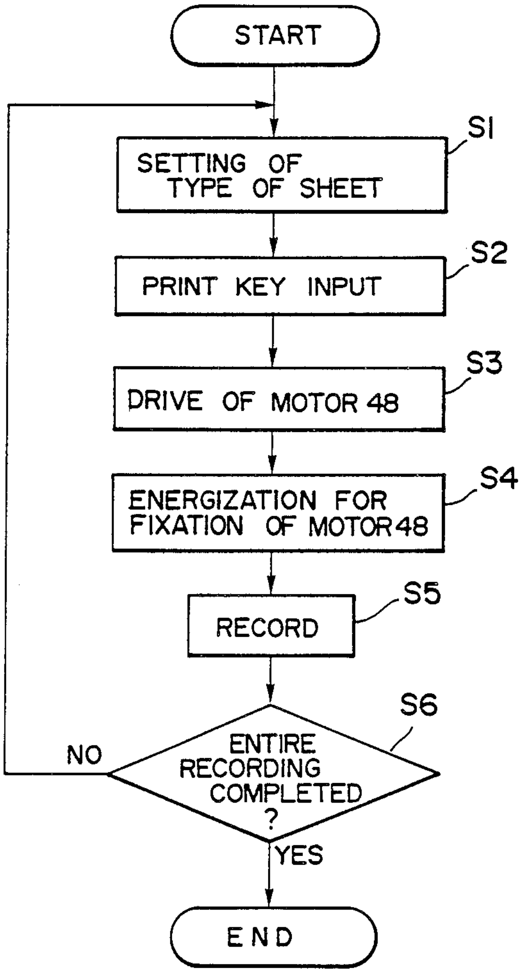
FIG. 6 is a flow chart showing the control sequence of a CPU shown in FIG. 5.

FIG. 6 is a flow chart showing an example of a control sequence by the CPU 43.

At first, in a step S1, the variable resistor 40 is regulated to match the species of the recording sheet. Then a print key is actuated in a step S2, whereby the motor 48 is activated in a step S3. The motor 48 is rotated for a predetermined period to move the head arm 5. Then the motor 48 is fixed by energization in a step S4 to obtain an optimum head pressure. In this state a step S5 executes a recording operation. Then a step S6 discriminates whether all the recording operations are completed, and, if completed, the control procedure is terminated. If the recording operations are not yet complete, the sequence returns to the step S1 to repeat the foregoing steps.

Though the foregoing embodiment is limited to a serial thermal-transfer recording apparatus, it is similarly applicable also to a thermal recording apparatus utilizing a thermal-sensitive sheet, and furthermore to other apparatus with a thermal head of different type, for example, a line print type.

Also the pressure regulating mechanism may utilize, instead of the coil spring, an oil pressure, an air pressure, a plate spring or the like.

As explained above, the foregoing embodiment of the present invention employs an elastic member between a head arm and a driving member and regulates the biasing force of the elastic member according to a change in the driving point of the driving member thereby regulating the pressure of the printing head. It is therefore possible to suitably regulate the head pressure according to the species of the recording sheet, thereby improving the service life and reliability, and providing a thermal recording apparatus capable of clear image recording with a high density.

Now reference is made to FIGS. 7 to 15 for explaining other embodiments. In the following description there are also cited FIGS. 2 and 4 used in the explanation of the foregoing embodiment.

The following embodiment comprises head pressure regulation means for regulating the pressure of a thermal head on a recording medium; energy regulation means for regulating the electric energy to be supplied to the thermal head; instruction means for selecting the record density on the recording medium; correlation means for correlating the record density selected by said instruction means with the set levels of the pressure and electric energy; and control means for regulating the record density by controlling said regulation means according to the set values.

Still another embodiment of the present invention comprises head pressure regulation means for regulating the pressure of a thermal head on a recording medium; head pressure instruction means for selecting the pressure; energy regulation means for regulating the electric energy to be supplied to the thermal head; energy instruction means for selecting the electric energy; memory means for storing plural sets of the value instructed by the head pressure instruction means and the value instructed by the energy instruction means; control means for controlling the head pressure regulation means and the energy regulation means in response either to values instructed by the head pressure instruction means and the energy instruction means or to a selected one of the plural sets stored in the memory means; and renewal means for renewing selected one of said plural sets stored in the memory, in response to the instruction of the head pressure instructing means and the energy instruction means.

In the foregoing embodiments, the pressure of the thermal head on the recording medium is regulated by the head pressure regulation means, while the electric energy supplied to the thermal head is regulated by the energy regulation means. The record density of the image on the recording medium, instructed by the instruction means, is correlated with the set values of the pressure and the electric energy, and is regulated by controlling the head pressure regulation means and the energy regulation means in response to the set values.

In another embodiment, the pressure of the thermal head on the recording medium is regulated by the head pressure regulation means, while the electric energy supplied to the thermal head is regulated by the energy regulation means. Also provided are head pressure instruction means for instructing the head pressure and energy instruction means for instructing the electric energy, and memory means for storing plural sets of the value instructed by the head pressure instruction means and the value instructed by the energy instruction means. Thus the head pressure regulation means and the energy regulation means are controlled in response either to the values instructed by the head pressure instruction means and the energy instruction means, or to a selected one of the plural sets stored in the memory means.

Now, in the following there will be explained preferred embodiments of the present invention, while making reference to the attached drawings.

(Electronic typewriter (FIG. 7))

Figure 7:
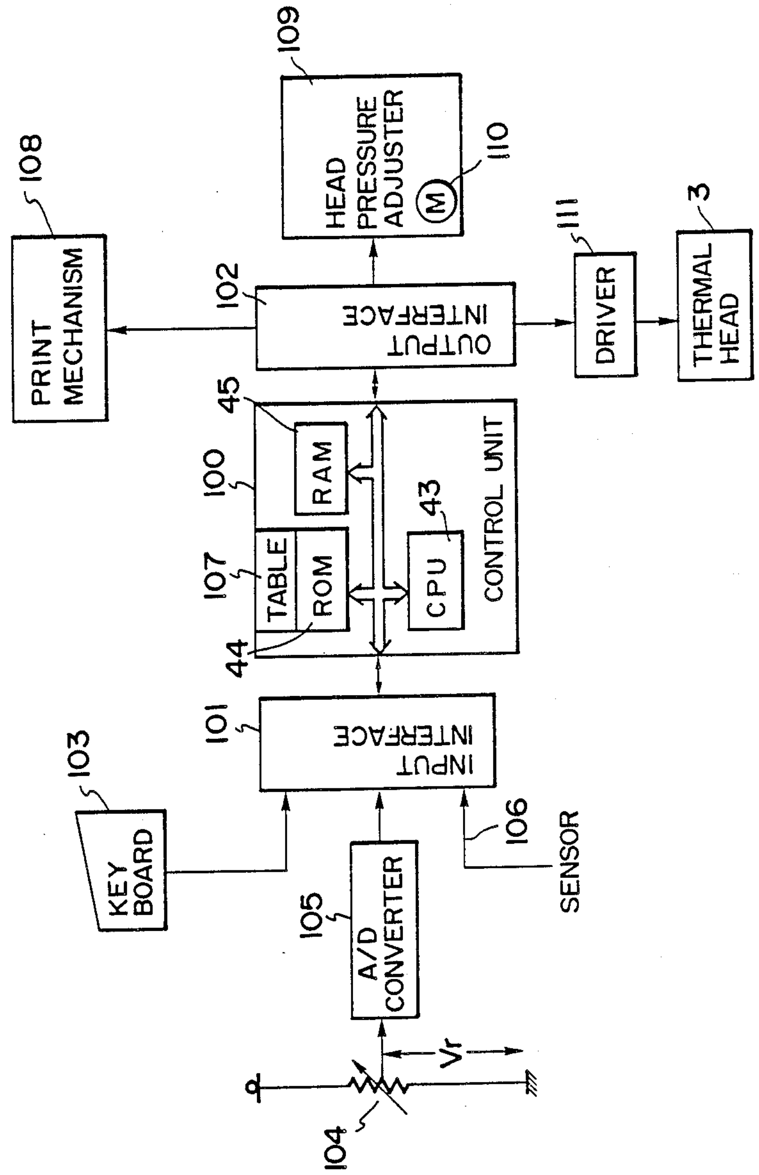
FIG. 7 is a block diagram showing the outline of an electronic typewriter constituting a first embodiment.

FIG. 7 is a block diagram of an electronic typewriter in which the present invention is applied. A control unit 100, for controlling the entire apparatus, is provided with a CPU 43, for example a microprocessor, which executes output of various control signals, processing of input signals from an input interface 101, and output of various signals to an output interface 102 for function controls, according to a control program stored in the ROM 44 and shown by a flow chart in FIG. 12. A RAM 45 is used as a working area for the CPU 43, and temporarily stores the set values of a variable resistor 104 shown in FIG. 7.

An input interface 101 transmits the signals from a keyboard 103, various sensors and an A/D converter 105 to the control unit 100. An output interface 102 releases print data from the control unit 100, control signals to a printing mechanism 108 and control signals to a head pressure regulation unit 109 to be explained later. In this manner the control unit 100 executes serial recording by driving the printing mechanism unit 108.

Figure 8:
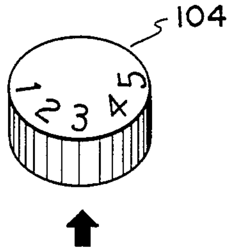
FIG. 8 is an external view of a variable resistor.

A keyboard 103 is used for entering text information and various commands, and code information entered from said keyboard 103 is supplied to the control unit 100 through the input interface 101. A character code from the keyboard 103 is once stored in the RAM 45, then developed into a pattern according to pattern data stored in the ROM 44 and supplied to the thermal head 3 for recording. FIG. 8 shows the external view of a density regulating variable resistor 104, by means of which the operator regulates the print density according to the type of the recording sheet to be used.

An A/D converter 105 converts a voltage Vr determined by the variable resistor 104 into a digital signal.

Input signals 106 are received from sensors for detecting the presence of the recording sheet in the printing mechanism 108, the temperature of the thermal head 3 etc. The aforementioned CPU 43 stores the output signal of the A/D converter 105, entered through the input interface 101, in the RAM 45, then refers to a table 107 in the ROM 44 in relation to thus stored value, and determines the set values of the head pressure, i.e. the energizing time of the motor 110 and the supply voltage to the heat generating elements of the thermal head 3 corresponding to the value of the variable resistor 104. According to the set values thus determined, the CPU 43 sends control signals through the output interface 102 to a driver 111 for the thermal head and a head pressure regulation unit 109, thereby regulating the record density.

The head pressure regulation unit 109, of which details are shown in FIGS. 3 and 4, rotates the motor 110 according to the instruction from the control unit 100, thereby regulating the pressure of the thermal head 3. The driver 111 controls the heat generation of the thermal head 3 with a voltage or an energizing time instructed by the control unit 100, according to the print data from the output interface 102. The print mechanism 108 comprises a sheet feeding mechanism for advancing the recording sheet, and a carriage drive mechanism for effecting a scanning motion of the serial head.

(Printing unit (FIGS. 2 and 9))

Figure 9:
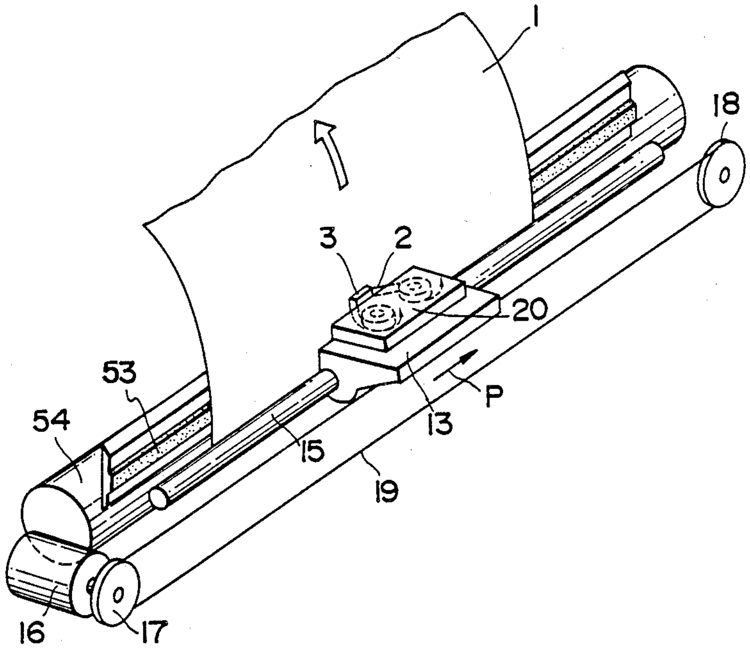
FIG. 9 is an external perspective view of a thermal recording apparatus.

The present embodiment is also applicable to a serial thermal-transfer recording apparatus shown in FIG. 2. FIG. 9 is a perspective view of a serial thermal-transfer recording unit constituting another embodiment, wherein like components as those in FIG. 2 are represented by like numbers and will not be explained further.

In FIG. 9, the thermal head 3 mounted on the carriage 13 records, on the recording sheet 1 supported by a flat platen 53. There is also provided a feed roller 54 for advancing the recording sheet 1. The carriage 13 performs recording in the course of movement along the guide shaft 15 positioned parallel to the flat platen 53.

(Head pressure regulation unit (FIGS. 3 and 4))

It is essentially same as in the foregoing embodiment shown in FIGS. 3 and 4.

(Heat generating elements of thermal head (FIG. 10))

Figure 10:
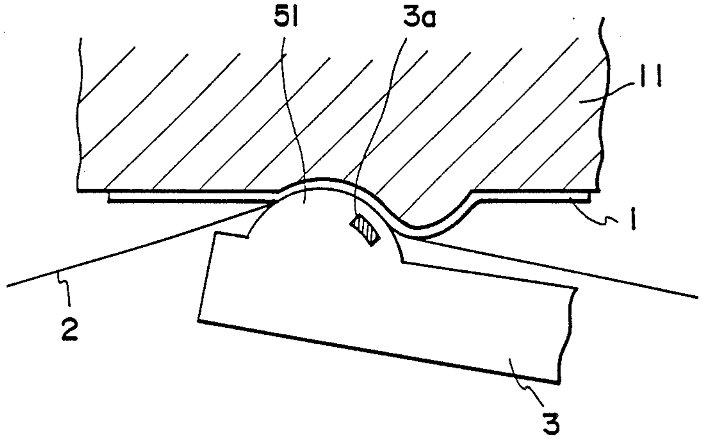
FIG. 10 is a magnified view of the heat generating portion of a thermal head.

FIG. 10 is a magnified view of a heat generating portion of the thermal head 3, wherein 51 is a glaze layer of the thermal head 3, and 3*a* is a resistor for generating heat by a current therein. The ink ribbon 2 is heated by the thermal head 3, so that the ink at the activated heat-generating resistor is fused and transferred onto the recording sheet 1. The record density can be modified by a change in the voltage supplied to the resistor 3*a* or in the energizing time thereof.

(Explanation of function (FIG. 12))

Figure 12:
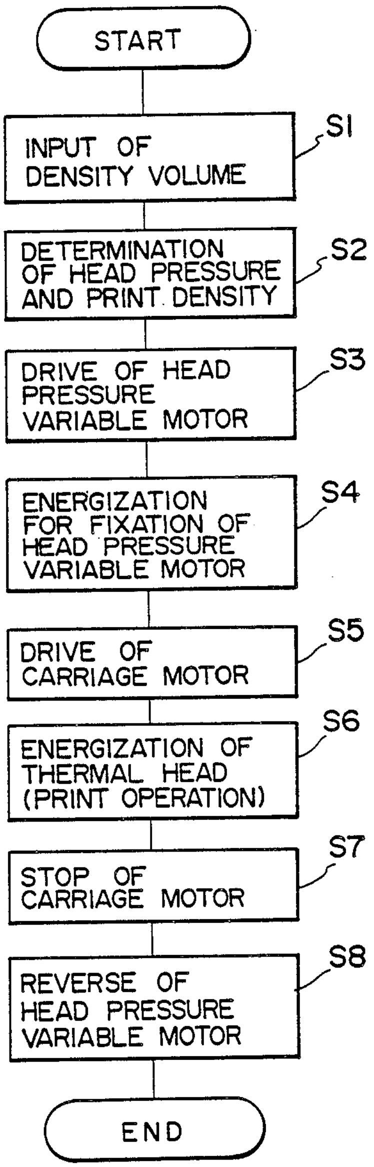
FIG. 12 is a flow chart showing a printing procedure in another embodiment.

FIG. 12 is a flow chart showing the printing operation of the electronic typewriter of the present embodiment, and this flow is initiated by a print instruction given through the keyboard 13.

In response to an instruction of printing of a character or a line given from the keyboard 103, a step S1 stores the set value (digital value of the voltage Vr) of the density regulating variable resistor 104 supplied through the A/D converter 105, in the RAM 45. In a step S2, the driving time of the motor 110 controlled by the head pressure regulation unit 109 and the driving voltage of the thermal head 3 controlled by the driver 111 are determined by making reference to the table 107 of the ROM 44, based on the digital value stored in the RAM 45.

FIG. 11 is a chart showing an example of the energy supplied to the heat generating element 3*a* and the head pressure corresponding to the species of the recording sheet, in the foregoing embodiments utilizing a cylindrical platen as shown in FIG. 2 or a flat platen as shown in FIG. 9. This chart is also usable in a second embodiment to be explained later.

The table 107 of the ROM 44 stores the values of the energy supplied to the heat generating elements 3*a* and the pressure of the thermal head 3, as shown in FIG. 11, corresponding to the output values of the A/D converter 105. Thus the CPU 43 reads the head pressure and voltage from the table 107 in response to the digital value from the A/D converter 105, stored in the RAM 45, and releases control signals to the head pressure regulation unit 109 and the driver 111 in response to the values read from the table 107, thereby regulating the print density.

Then a step S3 drives the motor 110 through the output interface 102 for a period, or a number of rotations, determined in the step S2, and a step S4 fixes the motor 110 by magnetization, thereby terminating the regulation of the head pressure. Then a step S5 initiates the drive of a carriage motor 16, and a step S6 energizes the thermal head 3 by sending print data, thereby performing a printing operation on the recording sheet 1. In this state the driver 111 controls the power supply to the thermal head 3 in response to the value of voltage or energizing time supplied from the control unit 100 together with the print data, thereby modifying the print density.

Upon completion of a printing operation of a character or a line, the sequence proceeds to a step S7 for terminating the rotation of the carriage motor 16. Then a step S8 reverses the motor 110 of the head regulation unit 109 in a direction opposite to the direction A in FIG. 3, thereby lifting the thermal head 3 from the platen 11 and thus terminating the printing operation.

If the motor 110 is a stepping motor, the step S3 rotates the motor 110 by a predetermined number of steps to regulate the printing pressure.

(Still another embodiment (FIGS. 13 - 15))

Figure 13:
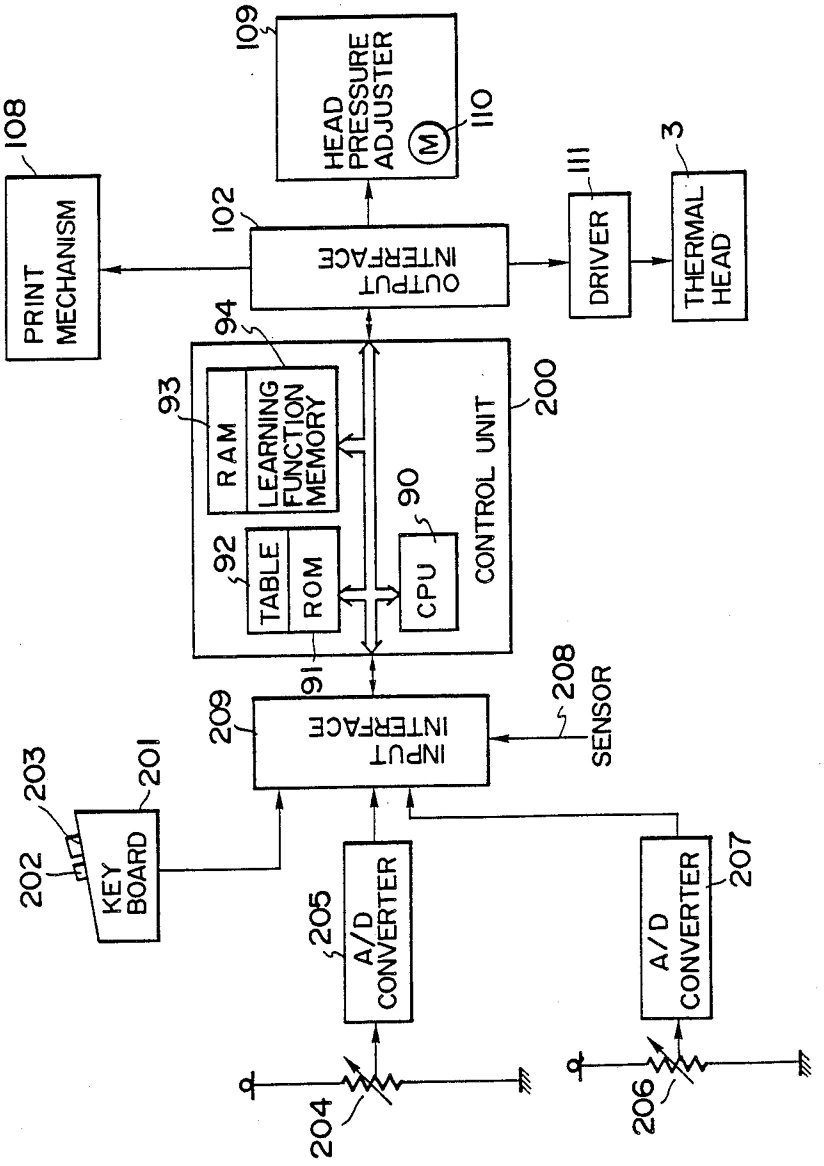
FIG. 13 is a block diagram showing the outline of an electronic typewriter constituting still another embodiment.

FIG. 13 is a block diagram of an electronic typewriter constituting still another embodiment, wherein like components as those in the foregoing embodiments are represented by same numbers.

There are provided a variable resistor 204 for indicating the pressure of the thermal head 3 according to the species of the recording sheet 1, and a variable resistor 206 for setting the electric energy to be supplied to the thermal head 3. The output voltages of the variable resistors 204, 206 are respectively converted into digital signals by A/D converters 205, 207. The output signals of said A/D converters 205, 207 are fed to a RAM 93 through an input interface 209, under the control of the CPU 90.

Figure 14:
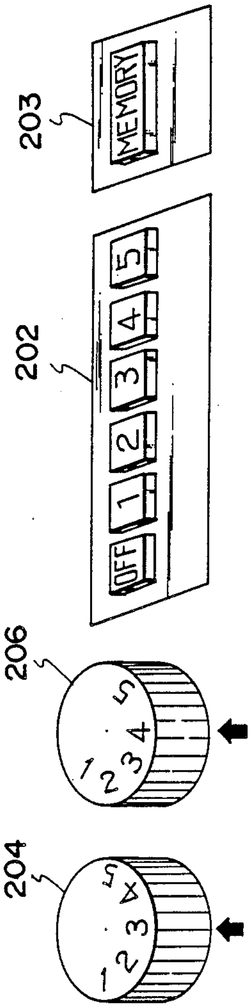
FIG. 14 is an external view of a variable resistor for regulating the heat pressure, a variable resistor for regulating the electric energy and learning function keys; and A flow chart showing FIG. 15 depicting

FIG. 14 is an external view of learning function switches of the keyboard 201 and the variable resistors 204, 206.

The variable resistor 204 determines the head pressure while the variable resistor 206 determines the energizing time or voltage of the thermal head 3. There are provided five learning function keys 202 corresponding to five sets of learning data. There is also provided a learning function memory key 203. Keys 202 and 203 are all alternate keys, and the learning function keys 202 are all turned off by the actuation of an OFF key.

The keyboard 201 is provided, as shown in FIG. 14, with learning function keys 202 for instructing density control based on learning function data, and a learning function memory key 203 for instructing storage in the learning function. A table 92 of the ROM 91 stores the set values of head pressure (energizing periods or numbers of rotations of the motor 110) corresponding to the set values of the variable resistor 204, and the supply voltages to the thermal head 3 corresponding to the set values of the variable resistor 206.

The learning function memory 94 stores five sets of the head pressure and the supply voltage or energizing time, and a set of the pressure of the thermal head 3 and the energy to be supplied to the heat generating resistor 3*a* is selected by actuating one of the learning function keys 202. Also when the learning function memory key 203 is actuated, the digital values of the voltages selected by the variable resistors 204 and 206 are stored in an area of the memory 94 selected by a learning function key 202.

Figure 15A:
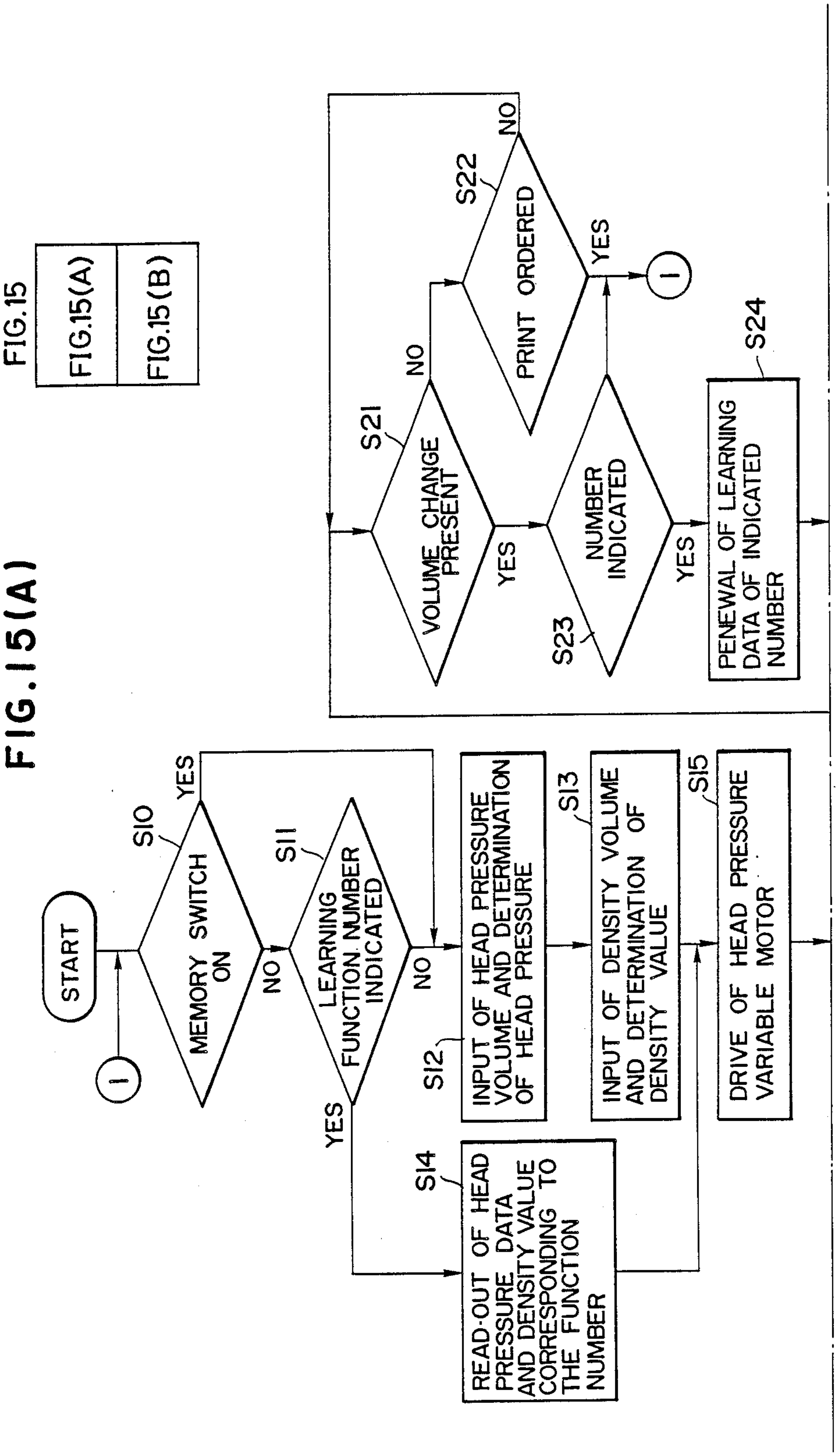
FIGS. 15A and 15B represent a printing procedure in a embodiment shown in FIG. 13.
Figure 15B:
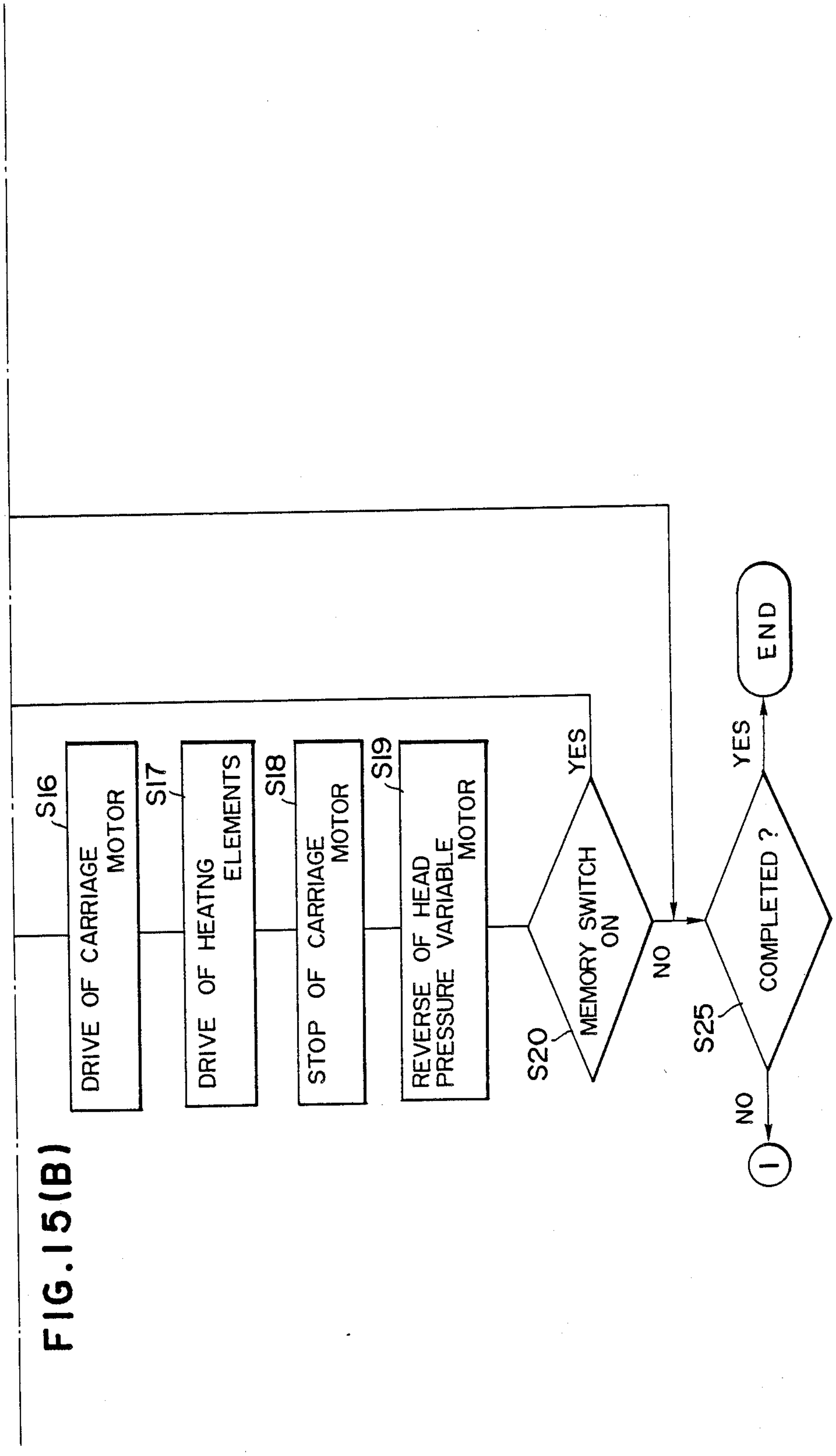

According to a program stored in the ROM 92 and shown in FIG. 15, the CPU 90 temporarily stores the input information from the keyboard 201 and the A/D converters 205, 207 in the RAM 93, and sends control information to the head pressure regulation unit 109 and the driver 111 through the output interface 102, based on thus stored information and on the data stored in advance in the ROM 92. The CPU 90 also executes controls for serial recording, by driving the printing mechanism 108.

In the following there will be given further explanation on the regulation of record density on the recording sheet 1. Based on the head pressure information corresponding to the setting of the variable resistor 204 and the energy information of the heat generating elements corresponding to the variable resistor 206, both stored in the RAM 93, the CPU 90 determines the energizing time of the motor and the supply voltage to the heat generating elements 3*a* of the thermal head 3 by referring to the table 92, and sends corresponding control signals to the heat pressure regulation unit 109 and the driver 111 through the output interface 102.

At the start of a recording operation, the head pressure regulation unit 109 energizes the motor 110 for a period determined by the control signal from the output interface 102, thereby rotating the motor pinion 36 by a predetermined amount. Also the driver 111 supplies the heat generating elements 3*a* of the thermal head 3 with a voltage determined as explained above, thereby effecting the recording operation. Also at the end of the recording operation, the head pressure regulation unit 109 reverses the motor 110 for a predetermined period to lift the thermal head 3 from the platen 11.

The aforementioned variable resistors 204, 206 are set in such a manner, for a recording sheet 1 with coarse surface, as to extend the energizing time of the motor 110 for increasing the head pressure and to elevate the supply voltage to the heat generating resistors 3*a*, thereby increasing the print density. On the other hand, for a recording sheet with smooth surface, the energizing time of the motor 110 is shortened by the variable resistor 204, thereby reducing the head pressure, and the voltage to the heat generating resistor 3*a* is reduced by the variable resistor 26 (See, for example, FIG. 11).

FIG. 15 is a flow chart of the printing procedure in the embodiment shown in FIG. 13.

When a printing operation is instructed by the keyboard 201, a step S10 discriminates whether the learning function memory switch 203 is turned on. If the switch is turned on, indicating the storage of the learning function, the sequence proceeds to a step S12 for entering the set values of the variable resistors 204 and 206.

On the other hand, if the learning function memory switch 203 is turned off, the sequence proceeds to a step S11 for discriminating whether any of the learning function keys 202 has been actuated. If none has been actuated, the sequence proceeds to the step S12 for entering the set value of the variable resistor 204 indicating the head pressure, and determining the head pressure by referring to the table 92. Then a step S13 enters the set value of the density variable resistor 206 indicating the supply voltage to the thermal head 3, and determines the voltage to be instructed to the driver 111, by making reference to the table 92.

On the other hand, if any of the learning function keys has been actuated in the step S11, the sequence proceeds to a step S14 for reading the data indicating the head pressure and the data indicating the supply voltage to the thermal head 3 from an area of the learning function memory 94 corresponding to the actuated learning function key. The data are digital signals corresponding to the voltages released from the A/D converters 205, 207.

A step S15 drives the motor 110 of the head pressure regulation unit 109 according to the head pressure data read and determined in the step S12 or S14, thereby regulating the head pressure. Then a step S16 starts the drive of the carriage motor 16, and a step S17 supplies the driver 111 with the print data and the supply voltage (or energizing time) for the thermal head 3 determined in the step S14 or S13, thereby activating the thermal head 3 and performing the printing operation.

Then, upon completion of the printing operation of a character or a line in this manner, the sequence proceeds to a step S18 to stop the carriage motor 16, and a step S19 reverses the motor 110 of the head pressure regulation unit 109 by a predetermined amount, thereby lifting the thermal head 3 from the platen 11.

On the other hand, if the learning function memory switch 203 has been actuated in the step S20, the sequence proceeds to a step S21 to discriminate whether the set value of the variable resistor 204 or 206 has been changed, by comparing the original set value stored in the RAM 93 with the digital value entered from the A/D converter 205 or 206. If a next print instruction is entered prior to the change of the set value of the variable resistors 204, 206, the sequence proceeds to the step S10 to execute the printing operation.

If the step S21 discriminates a change in the set value of the variable resistor 204 or 206, the sequence proceeds to a step S23 to discriminate whether any of the learning function keys 202 has been actuated. If none has been actuated, the sequence proceeds to a step S10 without renewing the stored data. On the other hand, if a number of the learning function is designated by a learning function key 202 in the step S23, the sequence proceeds to a step S24 for renewing the data, corresponding to the number, in the memory 94. This can be achieved, for example, by storing the digital values from the A/D converters 205, 207 in a corresponding area of the learning function memory 94.

Then a step S25 discriminates whether the printing procedure has been completed, and, if not, the sequence returns to the step S10 to repeat the aboveexplained sequence.

In this manner, the data in the memory 94 corresponding to the number designated by the learning function key 202 are renewed, and the optimum head pressure and optimum head driving energy can thereafter be selected by merely selecting the number of data with the learning function keys 202, for example according to the species of the recording sheet 1.

The above-mentioned stored data can be protected from the interruption of power supply, by forming at least the learning function memory 94 of the RAM 93 as non-volatile.

In the foregoing first and second embodiments, particularly employing a cylindrical platen, it is preferable, for a rigid recording sheet 1, to extend the energizing time of the motor 110 thereby increasing the head pressure (about 500 gr. for an official postcard), and, for a soft recording sheet, to shorten the energizing time thereby reducing the head pressure.

Though the foregoing embodiments have been limited to a serial thermal-transfer recording apparatus, the present invention is likewise applicable to a thermal recording apparatus utilizing a thermosensitive sheet, and other recording apparatus with different types of thermal head, such as a line print type.

Also the mechanism for regulating the head pressure may be those utilizing oil pressure, air pressure or a plate spring instead of the coil spring.

In the foregoing embodiment the learning function memory 94 is designed to store the output digital signals of the A/D converters, but it is also possible to store the values of head pressure and voltage or energizing time determined by the digital signals.

Also the aforementioned species of the recording medium are not limited to the surface smoothness, rigidity and thickness, but include the constituting material such as ordinary paper or plastics.

As explained before, the foregoing embodiment allows regulation of the head pressure and the electric energy supplied to the heat generating elements of the thermal head in combination by a variable resistor or a selector switch, so that the user can select an optimum printing condition by a single operation according to the kind of recording sheet to be employed.

It is also possible to employ separate variable resistors for respectively regulating the head pressure and the supply voltage to the thermal head and to store the set values of the resistors corresponding to the species of the recording sheet, so that the head pressure and the supply energy can be easily regulated.

In addition, since the stored set values are renewed by a new setting of each variable resistor, so that optimum set values can be stored corresponding to the quality of the recording sheet.

As explained before, the foregoing embodiment allows regulation of both the head pressure and the supply energy to the thermal head by means of single density regulating means, so that the density regulation in response for example to a change in the recording sheet can be simplified.

Also the other embodiment is capable of regulating the head pressure and the supply energy to the thermal head in optimum manner, to store the set values of the head pressure and supply energy corresponding to different kinds of recording sheet, and to arbitrarily read any of thus stored values, thereby simplifying the regulation of the head pressure and the supply energy.

Though the foregoing embodiments have been limited to a thermal-transfer printer, the present invention is applicable also to a so-called thermal printer. Consequently the recording medium used for image recording include plain paper, thermal paper, plastic sheet for overhead projector etc. Furthermore the present invention is applicable to so-called current thermal-transfer printing, in which an electrode of a printing head supplies an electric current to a conductive layer of an ink sheet, and the ink of the ink sheet is transferred to a recording medium by the heat generated in said ink sheet itself, thereby achieving image recording. Consequently the printing head can be a thermal head as explained in the foregoing embodiments or a head with an electrode. Also the species of the recording medium can be identified by the entry of information indicating said species by manual operation of the user, or by detecting a marker provided on the recording medium with a sensor provided for this purpose.

As explained in the foregoing, the present invention provides a thermal recording apparatus capable of clear image recording on a recording medium.

What is claimed is:

1. A thermal recording apparatus for image recording on a recording medium, comprising:

a thermal head for image recording on said recording medium;

discrimination means for discriminating the species of said recording medium; and pressure varying means for varying the force for maintaining the pressing condition by said thermal head on said recording medium according to the species thereof discriminated by said discrimination means.

2. A thermal recording apparatus according to claim 1, wherein said head comprises a heat generating element.

3. A thermal recording apparatus according to claim 1, wherein said head is adapted to press said recording medium across an ink sheet bearing ink thereon.

4. A thermal recording according to claim 1, wherein said recording medium is thermosensitive paper.

5. A thermal recording apparatus according to claim 1, wherein said head comprises an electrode from which an electric current is supplied to a conductive layer of an ink sheet thereby generating heat in said ink sheet itself and transferring the ink thereof to said recording medium, thus achieving image recording.

6. A thermal recording apparatus according to claim 1, wherein said discrimination means is given information on the species of said recording medium by a manual operation of the operator.

7. A thermal recording apparatus according to claim 1, wherein said discrimination means is given information on the species of said recording medium by the detection of a sensor.

8. A thermal recording apparatus for image recording on a recording medium, comprising:

a head for image recording on said recording medium;

discrimination means for discriminating the species of said recording medium; and pressure varying means for varying the pressure of said head on said recording medium according to the species thereof discriminated by said discrimination means; wherein said pressure varying means comprises an elastic member between a head arm bearing said head and a driving mechanism, and is adapted to compress said elastic member in response to a movement of a driving point with respect to said elastic member.

9. A thermal recording apparatus for image recording on a recording medium, comprising:

a head for image recording on said recording medium;

head pressure regulation means for regulating the pressure of said head on said recording medium;

energy regulation means for regulating the electric energy to be supplied to said head;

instruction means for instructing the density of the image to be recorded on said recording medium; and control means for controlling said head pressure regulation means and said energy regulation means in response to the instruction by said instruction means.

10. A thermal recording apparatus according to claim 9, further comprising correlation means for correlating the image density instructed by said instruction means with the set values of said pressure and said electric energy, wherein said head pressure regulation means and said energy regulation means are controlled in response to said set values.

11. An apparatus according to claim 9, wherein said head presses a platen through an ink sheet containing ink thereon and said recording medium.

12. A thermal recording apparatus for image recording on a recording medium, comprising:

a head for image recording on said recording medium;

head pressure regulation means for regulating the pressure of said head on said recording medium;

head pressure instruction means for instructing said pressure;

energy regulation means for regulating electric energy to be supplied to said head;

energy instruction means for instructing the electric energy to be supplied to said head;

memory means for storing plural sets of a predetermined value instructed by said head pressure instruction means and a predetermined value instructed by said energy instruction means; and control means for designating one of said plural sets of instruction values stored in said memory means and controlling said head pressure regulation means and said energy regulation means in response to thus read instruction values.

13. A thermal recording apparatus according to claim 12, wherein said control means is also adapted to control said head pressure regulation means and said energy regulation means in response to a value instructed by said head pressure instruction means and a value instructed by said energy instruction means.

14. A thermal recording apparatus according to claim 12, further comprising renewal means for renewing one of plural sets stored in said memory means, according instructions of said head pressure instruction means and said energy instruction means.

15. A thermal recording apparatus according to claim 12, wherein said head is a thermal head provided with a heat generating element.

16. An apparatus according to claim 11, wherein said head presses a platen though an ink sheet containing ink thereon and said recording medium.

17. A thermal recording apparatus for transferring ink from an ink sheet containing ink-thereon to a medium to be recorded so as to record onto said recording medium, comprising:

a platen;

a thermal head for recording onto said recording medium; said head having a heat generating section;

discriminating means for discriminating species of said recording medium, and pressure control means for controlling the force for maintaining the pressing condition by said thermal head through said ink sheet and said recording medium on said platen in accordance with the species of said recording medium discriminated by said discriminating means.

* * * * *

UNITED STATES PATENT AND TRADEMARK OFFICE
CERTIFICATE OF CORRECTION

PATENT NO. : 4,879,566

DATED : November 7, 1989

INVENTOR(S) : Hanabusa

It is certified that error appears in the above-identified patent and that said Letters Patent is hereby corrected as shown below:

SHEET 13 OF 14,
Fig. 15(A), Box S24, change "PENEWAL" to --RENEWAL--.

COLUMN 1,
Line 49, change "anticlockwise" to --counterclockwise--.

COLUMN 3,
Lines 1, 2 and 3 should read --Fig. 15 depicting Figs, 15A and 15B represent a flow chart showing a printing procedure in an embodiment shown in Fig. 13.--.

COLUMN 9,
Line 66, change "resistor 26" to --resistor 206--.

COLUMN 10,
Line 20, change "keys" to --keys 202--.

COLUMN 12,
Line 5, change "include" to --may include--.

COLUMN 14,
Line 23, change "though" to --through--; and

UNITED STATES PATENT AND TRADEMARK OFFICE
CERTIFICATE OF CORRECTION

PATENT NO. : 4,879,566 Page 2 of 2

DATED : November 7, 1989

INVENTOR(S) : Hanabusa

It is certified that error appears in the above-identified patent and that said Letters Patent is hereby corrected as shown below:

COLUMN 14,

Line 26, change "ink-thereon" to --ink thereon--

Signed and Sealed this

Third Day of September, 1991

*Attest:*

HARRY F. MANBECK, JR.

*Attesting Officer* *Commissioner of Patents and Trademarks*